Fig. 1

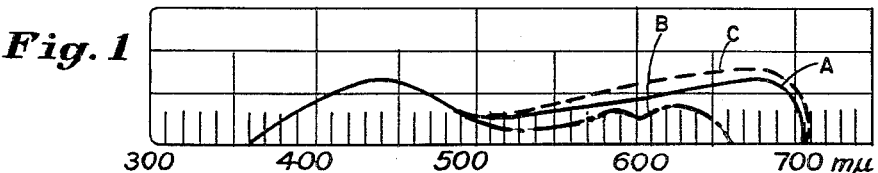

A = 9-ETHYL-3,3'-DIMETHYL-4,5,4',5'-DIBENZOTHIACARBOCYANINE CHLORIDE
B = 2-[DI-(1-ETHYL-2(1H)-β-NAPHTHOTHIAZOLYLIDENE) ISOPROPYLIDENE]-1,3-INDANDIONE
C = 9-ETHYL-3,3'-DIMETHYL-4,5,4',5'-DIBENZOTHIACARBOCYANINE CHLORIDE PLUS 2-[DI-(1-ETHYL-2(1H)-β-NAPHTHOTHIAZOLYLIDENE) ISOPROPYLIDENE]-1,3-INDANDIONE

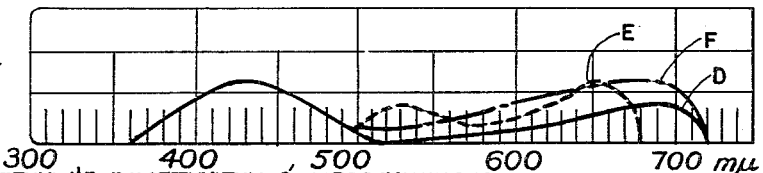

Fig. 2

D = 9-ETHYL-1,3-DIMETHYLTHIA-2'-CARBOCYANINE IODIDE
E = 1,3-DIETHYL-5-[DI-(1-ETHYL-2(1H)-β-NAPHTHOTHIAZOLYLIDENE) ISOPROPYLIDENE] BARBITURIC ACID
F = 9-ETHYL-1,3-DIMETHYLTHIA-2'-CARBOCYANINE IODIDE PLUS 1,3-DIETHYL-5-[DI-(1-ETHYL-2(1H)-β-NAPHTHOTHIAZOLYLIDENE) ISOPROPYLIDENE] BARBITURIC ACID

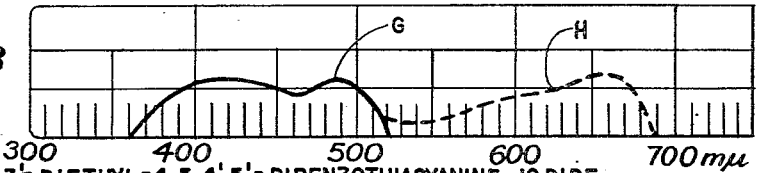

Fig. 3

G = 3,3'-DIETHYL-4,5,4',5'-DIBENZOTHIACYANINE IODIDE
H = 3,3'-DIETHYL-4,5,4',5'-DIBENZOTHIACYANINE IODIDE PLUS 1,3-DIETHYL-5-[DI-(1-ETHYL-2(1H)-β-NAPHTHOTHIAZOLYLIDENE) ISOPROPYLIDENE] BARBITURIC ACID

United States Patent Office 2,704,714
Patented Mar. 22, 1955

2,704,714

SUPERSENSITIZATION OF PHOTOGRAPHIC SILVER HALIDE EMULSIONS

Burt H. Carroll and Jean E. Jones, Rochester, N. Y., assignors to Eastman Kodak Company, Rochester, N. Y., a corporation of New Jersey Application January 13, 1954, Serial No. 403,822

17 Claims. (Cl. 95—7)

This invention relates to photographic emulsions containing cyanine dyes, and in supersensitizing combination, certain un-ionized dyes.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found a new means of altering the sensitivity in emulsions containing cyanine dyes. Since the conditions in the emulsion, i. e. the hydrogen ion and/or the silver ion concentration undergo little or no change in our method, we shall designate our new method as a kind of supersensitization.

It is, therefore, an object of our invention to provide photographic emulsions containing cyanine dyes, and in supersensitizing combination therewith, certain un-ionized dyes. Another object is to provide a process for preparing these supersensitized emulsions. Other objects will become apparent from a consideration of the following description and examples.

The cyanine dyes useful in practicing our invention can advantageously be represented by the following general formula:

I

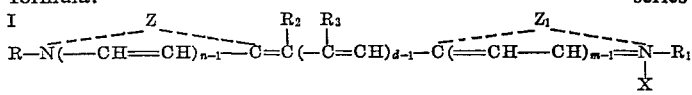

wherein R and $R_1$ each represents an alkyl group, such as methyl, ethyl, n-propyl, carbethoxymethyl, etc., $R_2$ and $R_3$ each represents a hydrogen atom or an alkyl group, such as methyl, ethyl, n-propyl, etc., $d$, $m$, and $n$ each represents a positive integer of from 1 to 2, X represents an acid radical, such as chloride, iodide, bromide, perchlorate, p-toluenesulfonate, benzenesulfonate, ethylsulfate, methylsulfate, etc., and Z and $Z_1$ each represents the non-metallic atoms necessary to complete a heterocyclic nucleus containing from 5 to 6 atoms in the heterocyclic ring, e. g. a heterocyclic nucleus of the thiazole series (e. g. thiazole, 4-methylthiazole, 4-phenylthiazole, 5-methylthiazole, 5-phenylthiazole, 4,5-dimethylthiazole, 4,5-diphenylthiazole, etc.), a heterocyclic nucleus of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazol, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, etc.), a heterocyclic nucleus of the naphthothiazole series (e. g. α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. α-naphthoselenazole, β-naphthoselenazole, etc.), a heterocyclic nucleus of the benzoxazole series (e. g. benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc), a heterocyclic nucleus of the naphthoxazole series (e. g. α-naphthoxazole, β-naphthoxazole, etc.), a heterocyclic nucleus of the 2-quinoline series (e. g. 2-quinoline, 6-methyl - 2 - quinoline, 7 - methyl - 2 - quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6 - methoxy - 2 - quinoline, etc.), a heterocyclic nucleus of the 4-quinoline series (e. g. 4-quinoline, 6-methoxy-4-quinoline, 7-methyl-4-quinoline, 8-methyl-4-quinoline, etc.), etc. However, cyanine (i. e. simple cyanine and carbocyanine) dyes wherein both Z and $Z_1$ represent the non-metallic atoms necessary to complete a heterocyclic nucleus of the quinoline series and $R_2$ and/or $R_3$ represent an alkyl group are not advantageous in practicing our invention.

The un-ionized dyes useful in practicing our invention can advantageously be represented by the following general formula:

II

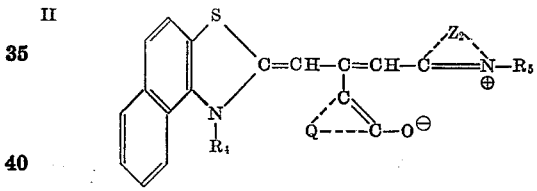

wherein $R_4$ and $R_5$ each represents an alkyl group, i. e. an alcohol radical, e. g. methyl, ethyl, n-propyl, n-butyl, β-hydroxyethyl, carbethoxymethyl, benzyl (phenylmethyl), etc., Q represents the non-metallic atoms necessary to complete an indandione nucleus or a heterocyclic nucleus containing from 5 to 6 atoms in the heterocyclic ring, such as those of the pyrazolone series (e. g. 3-methyl-1-phenyl-5-pyrazolone, 1-phenyl-5-pyrazolone, 1-(2-benzothiazolyl-3-methyl-5-pyrazolone, etc.), those of the isoxazole series (e. g. 3-phenyl-5-(4H)-isoxazolone, 3-methyl-5-(4H)-isoxazolone, etc.), those of the indandione series (e g. 1,3-diketohydrindene, etc.), those of the oxindole series (e. g. 1-alkyl-2,3-dihydro-2-oxindoles, etc.), those of the 2,4,6-triketohexahydropyrimidine series (e. g. barbituric acid or 2-thiobarbituric acid as well as their 1-alkyl (e. g. 1-methyl, 1-ethyl, 1-n-propyl, 1-n-heyptyl, etc.), or 1,3-dialkyl (e. g. 1,3-dimethyl, 1,3-diethyl, 1,3-di-n-propyl, 1,3-diisopropyl, 1,3-dicyclohexyl, 1,3-di(β-methoxy-ethyl), etc.), or 1,3-diaryl (e. g. 1,3-diphenyl, 1,3-di(p-chlorophenyl), 1,3-di(p-ethoxycarbonylphenyl), etc.), or 1-aryl (e. g. 1-phenyl, 1-p-chlorophenyl, 1-p-ethoxycarbonylphenyl), etc.) or 1-alkyl-3-aryl (e. g. 1-ethyl-3-phenyl, 1-n-heptyl-3-phenyl, etc.) derivatives, those of the rhodanine series (i. e. 2-thio-2,4-thiazolidinedione series) such as rhodanine, 3-alkylrhodanines (e. g. 3-ethylrhodanine, 3-allylrhodanine, etc.) or 3-arylrhodanines (e. g. 3-phenylrhodanine, etc.), etc., those of the 2(3H)-imidazo 1,2-α pyridone series, those of the 5,7-dioxo-6,7-dihydro-5-thiazole[3,2-α]pyrimidine series (e. g. 5,7-dioxo-3-phenyl-6,7-dihydro-5-thiazolo[3,2-α]pyrimidine, etc), those of the 2-thio-2,4-oxazolidinedione series (i. e. those of the 2-thio-2,4(3H,5H)-oxazoledione series) (e. g. 3-ethyl-2-thio-2,4-oxazolidinedione etc.), those of the thianaphthenone series (e. g. 2(3H)-thianaphthenone, etc.), those of the 2-thio-2,5-thiazolidinedione series (i. e. the 2-thio-2,5(3H,5H)-thiazoledione series) (e. g. 3-ethyl-2-thio- 2,5-thiazolidinedione, etc.), and $Z_2$ represents the non-metallic atoms necessary to complete a heterocyclic nucleus containing from 5 to 6 atoms in the heterocyclic ring, e. g. a heterocyclic nucleus of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, 7-hydroxybenzothiazole, etc.), a heterocyclic nucleus of the naphthothiazole series (e. g. $\alpha$-naphthothiazole, $\beta$-naphthothiazole, 7-methoxy-$\alpha$-naphthothiazole, 8-methoxy-$\alpha$-naphthothiazole, 5-methoxy-$\beta$-naphthothiazole, 5-ethoxy-$\alpha$-naphthothiazole, etc.), a heterocyclic nucleus of the benzoselenazole series (e. g. benzoselenazole, 5-chlorobenzoselenazole, 6-methoxybenzoselenazole, 5-methoxybenzoselenazole, etc.), a heterocyclic nucleus of the naphthoselenazole series (e. g. $\alpha$-naphthoselenazole, $\beta$-naphthoselenazole, etc.), a heterocyclic nucleus of the naphthoxazole series (e. g. $\alpha$-naphthoxazole, $\beta$-naphthoxazole, etc.), etc.

Simple cyanine dyes embraced by Formula I which have been found to be particularly useful comprise dyes selected from those represented by the following general formula:

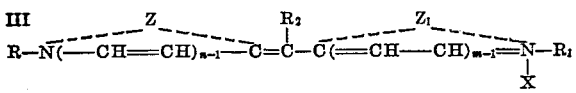

wherein R, $R_1$, $R_2$, $n$, $m$, X, Z and $Z_1$ each have the values given above.

Symmetrical carbocyanine dyes embraced by Formula I above which have been found to be particularly useful comprise those dyes represented by the following general formula:

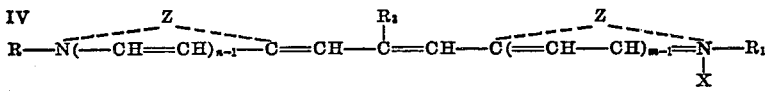

wherein R, $R_1$, $R_3$, X, $m$, $n$, and Z each have the values given above. When $R_3$ represents an alkyl group, Z represents the non-metallic atoms necessary to complete a heterocyclic nucleus other than a heterocyclic nucleus of the quinoline series.

Unsymmetrical carbocyanine dyes embraced by Formula I above which have been found to be particularly useful comprise those dyes represented by the following general formula:

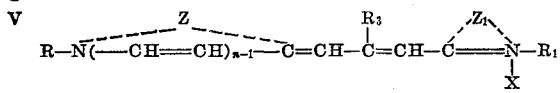

wherein R, $R_1$, $R_3$, X, $n$, and Z and $Z_1$ each have the values given above (provided, of course, that Z and $Z_1$ are different from one another).

The dyes represented by Formulas I, III, IV, and V above have been previously described in the prior art. See, for example, U. S. Patents 1,861,836 (dated June 7, 1932), 1,934,657 (dated November 7, 1933), 1,935,696 (dated November 21, 1933), 1,950,876 (dated March 13, 1934), 1,990,681 (February 12, 1935), and 2,112,140 (dated March 22, 1938), and Br. 439,857.

The dyes of Formula II are described in the copending application Serial No. 282,696, filed April 16, 1952 (now abandoned), and Serial No. 375,279, filed August 19, 1953, of Leslie G. S. Brooker and F. L. White.

According to our invention, we incorporate one or more of the cyanine dyes selected from those represented by Formulas I, III, IV, or V above with one or more of the dyes selected from those represented by Formula II above in a photographic emulsion. Our invention is particularly directed to the ordinarily employed gelatino-silver-halide emulsions. However, our supersensitizing combinations can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing our invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of our supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the cyanine (i. e. simple cyanine and carbocyanine) dyes selected from those represented by Formula I (or Formulas III, IV, or V) above, which we employ in practicing our invention, is of the order of from 0.05 to 0.3 g. per mol. of silver halide in the emulsion.

The un-ionized dyes selected from those represented by Formula II above are advantageously employed in concentrations on the order of from 0.05 to 0.3 g. per mol. of silver halide in the emulsion.

Generally speaking, the ratio of concentration of the dye of Formula II to the cyanine dye of Formula I (or III, IV, or V) can vary rather widely in our combinations, e. g. from 1:20 to 3:1 by weight in many cases.

The methods of incorporating sensitizing dyes in emulsions are well known to those skilled in the art. In practicing our invention, the sensitizing dyes can be incorporated in the emulsions separately or together. It is convenient to add the dyes separately in the form of solutions in appropriate solvents. Methanol, ethanol, pyridine, etc. (and especially pyridine) have proven satisfactory as solvents for the dyes of Formulas I, II, III, IV, and V which we employ. Acetone has also been found to be a suitable solvent in certain cases. Pyridine has been found to be a particularly efficacious solvent, in that an enhanced supersensitizing effect is demonstrated in certain cases when pyridine is employed. It has also been noted that while certain of the dyes of Formula II have only a slight sensitizing action (or no detectable action) when used alone, when the dyes of Formula II are used in conjunction with pyridine a noticeable increase in speed is observed. Pyridine is not essential to successful operations according to our invention, however. In general, it is advantageous to employ pyridine, diluted with methanol or acetone, as the solvent for the supersensitizing combinations of our invention. For example, the dye can be dissolved in pyridine and the solution then diluted with methanol or acetone. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to the flowable gelatino-silver-halide emulsion, the desired amounts of the stock solution of one of the dyes are slowly added, while stirring the emulsion.

Stirring is continued until the dye is thoroughly incorporated in the emulsion. Then the desired amount of the stock solution of the second dye is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly our invention is directed to any emulsion containing a combination of the aforesaid sensitizing dyes whereby a supersensitizing effect is obtained.

The following examples will serve to illustrate further the manner of practicing our invention. To different portions of the same batch of photographic gelatino-silver-bromiodide emulsion were added (1) a cyanine dye selected from those of Formula I (or III, IV, or V) above and (2) a combination of the cyanine dye of Formula I (or III, IV, or V) and an un-ionized dye selected from those represented by Formula II above. In some instances, a third coating was prepared using the same emulsion formula and adding only one of the un-ionized dyes selected from those of Formula II. In some instances, the table will show that this third coating gave only a low speed or one too low to measure in the region transmitted by the filter (designated asterisk in the table). Different emulsions were used in some of the examples, although the emulsions of each individual example were obtained from the same batch. However, the coatings of Examples 1 and 2 were obtained from the same batch of emulsion. The coatings of Examples 3, 6, and 7 were obtained from the same batch of emulsion, the coatings of Examples 4, 5, 9, 10, 11, and 12 were obtained from the same batch of emulsion, the coatings of Examples 13 to 17, 52, and 53 were obtained from the same batch of emulsion, the coatings of Examples 18 to 21 were obtained from the same batch of emulsion, the coatings of Examples 22 to 29, 54, 55, and 56 were obtained from the same batch of emulsion, the coatings of Examples 30 and 31 were obtained from the same batch of emulsion, and the coatings of Examples 32 to 51 were obtained from the same batch of emulsion. The coatings of Examples 1 to 12, 30 and 31 contained 20 cc./mol. AgX of pyridine, while the coatings of Examples 18, 19, 20 and 21 contained 30 cc./mol. AgX of pyridine. Before coating, the emulsions containing the sensitizing dyes were digested for a short time in a tank maintained at 52° C. The different portions of emulsion were then coated on supports and exposed in the usual manner in a spectrograph and a sensitometer (Type Ib) through a Wratten 25 filter, i. e., a filter which transmits substantially no light of wavelength shorter than 580 m$\mu$, and the exposed emulsions developed in the usual manner. The speed (red) gamma and fog for each of the coatings was determined and the results are recorded in Table A below. Further examples are recorded in Table B below, wherein additional information is given in certain instances with respect to a green light exposure, the exposure being made through a Wratten 58 filter, i. e. a filter which transmits only light of wavelengths lying between 465 and 620 m$\mu$. The results follow:

Table A

| Ex. | Dye (g./mol. AgX) | Red Light Exposure 10/1 Speed | Gamma | Fog |
|---|---|---|---|---|
| 1 | (a) 9-Ethyl-1′,3-dimethylthia-2′-carbocyanine iodide (0.080) | 8.2 | 1.97 | .05 |
|  | (b) 1,3-Diethyl-5-[di(1-ethyl-2(1H)-β-naphthothiazolylidene)isopropylidene] barbituric acid (0.040). | 9.0 | 1.72 | .05 |
|  | (c) dye (a) (0.080) plus dye (b) (0.020) | 35.0 | 2.23 | .04 |
| 2 | (d) 9-Ethyl-1′,3-dimethyl-4,5-benzoselena-2′-carbocyanine iodide (0.080) | 3.2 | 0.76 | .04 |
|  | (e) dye (d) (0.080) plus dye (b) (0.020) | 12.0 | 2.30 | .04 |
|  | (f) 9-Ethyl-3,3′-dimethyl-4,5,4′,5′-dibenzothiacarbocyanine chloride (0.080) | 24.5 | 2.97 | .05 |
| 3 | (g) dye (b) (0.020) | 7.1 | 1.76 | .05 |
|  | (h) dye (f) (0.080) plus dye (b) (0.020) | 48.0 | 2.56 | .06 |
| 4 | (i) 9-Ethyl-3,3′-dimethylthiacarbocyanine bromide (0.080) | 4.9 | 2.47 | .05 |
|  | (j) dye (i) (0.080) plus dye (b) (0.020) | 26.5 | 3.2 | .05 |
|  | (k) 9-Ethyl-3,3′-dimethyl-4,5,4′,5′-dibenzoselenacarbocyanine iodide (0.080) | 8.0 | 2.32 | .05 |
| 5 | (l) dye (b) (0.020) | 7.3 | 1.03 | .05 |
|  | (m) dye (k) (0.080) plus dye (b) (0.020) | 10.8 | 2.80 | .05 |
|  | (n) dye (f) (0.080) | 24.5 | 2.97 | .05 |
| 6 | (o) 1-Ethyl-5-[d i(1-ethyl-2(1H)-β-naphthothiazolylidene) isopropylidene] barbituric acid (0.020). | * | * | .05 |
|  | (p) dye (f) (0.080) plus dye (o) (0.020) | 42.0 | 2.68 | .06 |
|  | (q) 5-[(3- Ethyl-2(3H)-α- naphthothiazolylidene) (1- ethyl-2(1H)-β-naphthothiazolylidene) isopropylidene]-1-methyl-2-thiobarbituric acid (0.020). | 6.6 | 2.68 | .05 |
| 7 | (r) dye (f) (0.080) plus dye (q) (0.020) | 31.0 | 2.92 | .06 |
|  | (s) 2-[Di-(1-ethyl-2(1H)-β-naphthothiazolylidene)isopropylidene]-1,3-indandione (0.080) | 3.0 | 1.84 | .06 |
| 8 | (t) dye (f) (0.080) | 21.0 | 2.52 | .06 |
|  | (u) dye (f) (0.080) plus dye (s) (0.040) | 37.0 | 2.50 | .06 |
|  | (v) 4-[Di-(1-ethyl-2(1H)-β-naphthothiazolylidene) isopropylidene]-3-phenyl-5(4H)-isoxazolone (0.020). | 6.8 | 3.4 | .04 |
| 9 | (w) dye (i) (0.080) | 4.9 | 2.47 | .05 |
|  | (x) dye (i) (0.080) plus dye (v) (0.020) | 21.0 | 2.90 | .04 |
|  | (y) dye (o) (0.040) | * | * | .05 |
| 10 | (z) dye (i) (0.080) plus dye (o) (0.020) | 24.5 | 3.28 | .04 |
| 11 | (a′) dye (k) (0.080) | 8.0 | 2.32 | .05 |
|  | (b′) dye (k) (0.080) plus dye (v) (0.080) | 14.5 | 2.89 | .05 |
| 12 | (c′) dye (k) (0.080) plus dye (o) (0.020) | 11.5 | 2.27 | .05 |
| 13 | (d′) 3,3′-Diethylthiacarbocyanine iodide (0.080) | 6.1 | 1.90 | .05 |
|  | (e′) 5-[1-Ethyl-2(1H)-β-naphthothiazolylidene) (1-methyl-2(1H)-β-naphthothiazolylidene) isopropylidene]-1,3-di(β-methoxyethyl)barbituric acid (0.080). | 5.2 | 2.77 | .06 |
| 14 | (f′) dye (d′) (0.080) plus dye (e′) (0.080) | 48.0 | 1.62 | .08 |
|  | (g′) 3,3′-Diethyl-4,4′-dimethylthiazolocarbocyanine iodide (0.080) | 5.0 | 2.60 | .04 |
|  | (h′) dye (g′) (0.080) plus dye (e′) (0.080) | 35.5 | 2.12 | .06 |
| 15 | (i′) 3,3′-Diethyloxathiacarbocyanine iodide (0.080) | 2.5 | 1.30 | .04 |
|  | (j′) dye (i′) (0.080) plus dye (e′) (0.080) | 44.0 | 1.70 | .06 |
| 16 | (k′) 3,3′-Diethyl-4,5,4′,5′-dibenzothiacarbocyanine bromide (0.080) | 14.0 | 2.48 | .06 |
|  | (l′) dye (k′) (0.080) plus dye (e′) (0.080) | 26.5 | 2.26 | .08 |
| 17 | (m′) 3,3′-Diethyl-4,5,4′,5′-dibenzoselenacarbocyanine iodide (0.080) | 13.5 | 2.03 | .05 |
|  | (n′) dye (n′) (0.080) plus dye (e′) (0.080) | 17.5 | 2.38 | .07 |
| 18 | (o′) dye (f) (0.080) | 34.0 | 1.06 | .06 |
|  | (p′) 5-[(1-Ethyl-2(1H)-β-naphthothiazolylidene)(1-methyl-2(1H)-β-naphthoselenazolylidene) isopropylidene]-1,3-di (β-methoxyethyl) barbituric acid (0.080). | 29.0 | 2.34 | .06 |
|  | (q′) dye (f) (0.080) plus dye (p′) (0.025) | 52.0 | 0.82 | .07 |
| 19 | (r′) 5-[(Di(1-ethyl-2(1H)-β-naphthothiazolylidene) isopropylidene]-1-n- heptylbarbituric acid (0.080). | 8.2 | 0.70 | .06 |
|  | (s′) dye (f) (0.080) plus dye (r′) (0.025) | 62.0 | 0.93 | .07 |
| 20 | (t′) dye (i) (0.080) | 7.1 | 1.6 | .05 |
|  | (u′) dye (i) (0.080) plus dye (p′) (0.025) | 35.5 | 2.44 | .06 |

Table A—Continued

| Ex. | Dye (g./mol. AgX) | Red Light Exposure | | |
|---|---|---|---|---|
| | | 10/1 Speed | Gamma | Fog |
| 21 | (v') dye (i) (0.080) plus dye (r') (0.025) | 26.5 | 2.1 | .06 |
| | (w') dye (i) (0.080) | 17.0 | 1.30 | .05 |
| 22 | (x') 5-[(1- Ethyl-2(1H)-β- naphthothiazolylidene) (3-methyl-2(3H)-α-naphthoxazolylidene) isopropylidene]-1,3-di(β-methoxyethyl) barbituric acid (0.080). | 6.8 | 2.72 | .05 |
| | (y') dye (i) (0.080) plus dye (x') (0.030) | 33.0 | 1.76 | .06 |
| 23 | (z') 5-[(1- Ethyl-2(1H)-β- naphthothiazolylidene)(1- methyl-2(1H)-β-naphthoxazolylidene) isopropylidene]-1,3-di(β-methoxyethyl)barbituric acid (0.080). | 23.0 | 1.87 | .05 |
| | (a'') dye (i) (0.080) plus dye (z') (0.080) | 66.0 | 1.0 | .06 |
| 24 | (b'') 5-[(1- Ethyl-2(1H)-β-naphthothiazolylidene) (3-methyl-2(3H)-α-naphthothiazolylidene isopropylidene]-1,3-di(β-methoxyethyl)barbituric acid (0.080). | 12.6 | 2.70 | .05 |
| | (c'') dye (i) (0.080) plus dye (b'') (0.080) | 24.0 | 1.7 | .05 |
| 25 | (d'') 5,5'-Dichloro-3,3'-triethylthiacarbocyanine bromide (0.080) | 39.0 | 1.64 | .06 |
| | (e'') dye (d'') (0.080) plus dye (x') (0.030) | 41.0 | 1.72 | .06 |
| 26 | (f'') dye (d'') (0.080) plus dye (z') (0.030) | 62.0 | 1.51 | .07 |
| 27 | (g'') dye (d'') (0.080) plus dye (b'') (0.030) | 50.0 | 1.40 | .07 |
| | (h'') dye (e') (0.080) | 4.4 | 2.34 | 0.5 |
| 28 | (i'') dye (e') (0.030) plus dye (d'') (0.080) | 80.0 | 1.43 | .07 |
| | (j'') 1,1'-Diethyl-2,2'-carbocyanine iodide (0.040) | 11.8 | 1.34 | .05 |
| 29 | (k'') dye (e') (0.080) plus dye (j'') (0.040) | 25.0 | 2.47 | .07 |

Table B

| Ex. | Dye (g./mol. AgX) | Red Light Exposure | | Green Light Exposure | | Fog |
|---|---|---|---|---|---|---|
| | | 10/i Speed | Gamma | 10/i Speed | Gamma | |
| | (l'') 1,1'-Diethyl-2,2'-cyanine iodide (0.040) | | | 2.8 | 1.06 | .04 |
| 30 | (m'') dye (b) (0.040) | 9.0 | 1.72 | 4.5 | 1.42 | .05 |
| | (n'') dye (l'') (0.040) plus dye (b) (0.040) | 8.6 | 2.16 | 12.6 | 2.06 | .05 |
| | (o'') 3,3'-Diethyl-4,5,4',5'-dibenzothiacyanine iodide (0.040) | | | 3.8 | 0.92 | .04 |
| 31 | (p'') dye (o'') (0.040) plus dye (b) (0.040) | 19.0 | 2.56 | 3.9 | 1.26 | .04 |
| | (q'') dye (e') (0.080) | 4.7 | 2.36 | * | * | .05 |
| 32 | (r'') 3,3'Diethylselenacyanine iodide (0.080) | * | * | * | * | .04 |
| | (s'') dye (e') (0.080) plus dye (r'') (0.080) | 33.0 | 1.52 | | | .06 |
| | (t'') dye (p') (0.080) | 3.9 | 2.32 | * | * | .05 |
| 33 | (u'') dye (r'') (0.080) plus dye (p') (0.080) | 37.0 | 1.25 | | | .05 |
| | (v'') dye (b) (0.080) | * | * | * | * | .06 |
| 34 | (w'') dye (b) (0.080) plus dye (r'') (0.080) | 3.55 | 0.44 | | | .05 |
| | (x'') 3,3'-Diethyloxacyanine iodide (0.080) | * | * | * | * | .03 |
| 35 | (y'') dye (x'') (0.080) plus dye (e') (0.080) | 29.0 | 1.49 | | | .05 |
| 36 | (z'') dye (p') (0.080) plus dye (x'') (0.080) | 31.0 | 1.10 | | | .05 |
| 37 | (a''') dye (x'') (0.080) plus dye (b) (0.080) | 11.2 | 0.52 | * | * | .05 |
| | (b''') 3-3'-Diethyl-4,5,4',5'-dibenzoxacyanine iodide (0.080) | * | * | * | * | .03 |
| 38 | (c''') dye (b''') (0.080) plus dye (e') (0.080) | 4.2 | 1.4 | * | * | .05 |
| 39 | (d''') dye (b''') (0.080) plus dye (p') (0.080) | 4.3 | 1.6 | * | * | .05 |
| | (e''') dye (o'') (0.080) | | | 5.3 | 1.2 | .04 |
| 40 | (f''') dye (o'') (0.080) plus dye (e') (0.080) | 36.0 | 1.78 | 5.0 | 1.52 | .07 |
| 41 | (g''') dye (o'') (0.080) plus dye (p') (0.080) | 38.0 | 1.78 | 5.5 | 1.32 | .05 |
| 42 | (h''') dye (o'') (0.080) plus dye (b) (0.080) | 17.8 | 2.04 | 4.5 | 1.72 | .05 |
| | (i''') dye (l'') (0.080) | * | * | 4.4 | 1.68 | .04 |
| 43 | (j''') dye (l'') (0.080) plus dye (e') (0.080) | 46.0 | 1.92 | 25.5 | 1.78 | .06 |
| 44 | (k''') dye (l'') (0.080) plus dye (p') (0.080) | 39.0 | 1.90 | 24.5 | 1.78 | .05 |
| 45 | (l''') dye (l'') (0.080) plus dye (b) (0.080) | 9.40 | 1.42 | 31.0 | 1.37 | .06 |
| | (m''') 1'-Ethyl-2-methylthia-2'-cyanine iodide (0.080) | * | * | 18.0 | 1.73 | .04 |
| 46 | (n''') dye (m''') (0.080) plus dye (e') (0.080) | 56.0 | 1.62 | 20.5 | 1.41 | .05 |
| 47 | (o''') dye (m''') (0.080) plus dye (p') (0.080) | 58.0 | 1.44 | 22.5 | 1.16 | .05 |
| 48 | (p''') dye (m''') (0.080) plus dye (b) (0.080) | 6.9 | 1.92 | 24.0 | 1.8 | .06 |
| | (q''') 1',3-Diethyl-6'-methoxy-5-phenylthia-2'-cyanine p-toluenesulfonate (0.080). | * | * | 29.0 | 1.72 | .04 |
| 49 | (r''') dye (q''') (0.080) plus dye (e') (0.080) | 24.0 | 2.0 | 14.8 | 1.59 | .06 |
| 50 | (s''') dye (q''') (0.080) plus dye (b) (0.080) | 4.7 | 1.72 | 17.8 | 1.94 | .06 |
| 51 | (t''') dye (q''') (0.080) plus dye (p') (0.080) | 22.5 | 2.08 | 13.0 | 1.72 | .05 |
| | (u''') 3,3',8-trimethylthiacyanine perchlorate (0.080) | * | * | * | * | .04 |
| 52 | (v''') dye (u''') (0.080) plus dye (e') (0.080) | 53.0 | 1.73 | | | .06 |
| | (w''') 1',3,8-trimethylthia-2'-cyanine perchlorate (0.080) | * | * | * | * | .04 |
| 53 | (x''') dye (w''') (0.080) plus dye (e') (0.080) | 34.0 | 2.0 | | | .06 |
| | (y''') dye (l'') (0.080) | 3.8 | 1.15 | * | * | .09 |
| 54 | (z''') dye (l'') (0.080) plus dye (x') (0.080) | 35.0 | 1.85 | 14.0 | 2.20 | .05 |
| 55 | (a'''') dye (l'') (0.080) plus dye (z') (0.080) | 38.0 | 1.71 | 25.0 | 1.66 | .05 |
| 56 | (b'''') dye (l'') (0.080) plus dye (b'') (0.080) | 15.0 | 1.93 | 9.0 | 2.32 | .06 |

Dye (b''') which was used in Examples 38 and 39 caused 0.3 log E desensitization in the emulsion, which accounts for the apparent lower red speed. The red/blue ratio for these coatings is higher, however, than for the coatings not supersensitized.

The accompanying drawing illustrates the supersensitizing effect obtained with three of our new combinations of dyes in gelatino-silver-bromiodide emulsions. Each figure of the drawing is a diagrammatic reproduction of three, or in the case of Figure 3, two, spectrograms. In each figure the sensitivity of the emulsion containing the cyanine dye of Formula I (or III), IV, or V) is represented by the solid curve. The uppermost curve (broken line) represents the sensitivity conferred on the emulsion by the combination of the cyanine dye of Formula I (or III, IV, or V) and the un-ionized dye of Formula II. In Figures 1 and 2 the third curve (also broken line) represents the sensitivity conferred on the emulsion by the un-ionized dye of Formula II alone. This third curve has been omitted in Figure 3 inasmuch as it would be identical to curve E in Figure 2.

In Figure 1, curve A represents the sensitivity of an ordinary gelatino-silver-bromiodide emulsion sensitized with 9 - ethyl - 3,3'-dimethyl-4,5,4',5'-dibenzothiacarbocyanine chloride, curve B represents the sensitivity of the same emulsion containing 2-[di-(1-ethyl-2(1H)-β-naphtho-thiazolylidene) isopropylidene]-1,3-indandione, and curve C represents the sensitivity of the same emulsion containing both 9-ethyl-3,3'-dimethyl-4, 5,4',5'-dibenzothiacarbocyanine chloride and 2-[di-(1-ethyl-2(1H)-β-naphthothiazolylidene) isopropylidene]-1,3-indandione. The sensitometric measurements for these emulsions are given in Example 8 of Table A.

In Figure 2, curve D represents the sensitivity of an ordinary gelatino-silver-bromiodide emulsion sensitized with 9-ethyl-1',3-dimethylthia-2'-carbocyanine iodide, curve E represents the sensitivity of the same emulsion containing 1,3-diethyl-5-[di-(1-ethyl-2(1H)-β-naphthothiazolylidene) isopropylidene] barbituric acid, and curve F represents the sensitivity of the same emulsion containing both 1,3-diethyl-5-[di-(1-ethyl-2(1H)-β-naphthothiazolylidene] isopropylidene) barbituric acid and 9-ethyl - 1',3 - dimethylthia - 2' - carbocyanine iodide. The sensitometric measurements for these emulsions are given in Example 1 of Table A.

In Figure 3, curve G represents the sensitivity of an ordinary gelatino-silver-bromiodide emulsion sensitized with 3,3'-diethyl-4, 5,4'5'-dibenzothiacyanine iodide and curve H represents the sensitivity of the same emulsion containing both 3,3'-diethyl-4,5,4',5'-dibenzothiacyanine iodide and 1,3-diethyl-5-[di-(1-ethyl-2(1H)-β-naphthothiazolylidene) isopropylidene] barbituric acid. The sensitometric measurements for these emulsions are given in Example 31 of Table B.

Our invention is primarily directed to the ordinarily employed gelatino-silver-halide developing-out emulsions, e. g. gelatino-silver-chloride, -chlorobromide, -chloroiodide, -chlorobromiodide, -bromide and -bromiodide developing-out emulsions. While the results in the above tables were obtained using gelatino-silver-bromiodide emulsions, excellent results have also been obtained using gelatino-silver-chlorobromide emulsions. Emulsions which form the latent image mostly inside the silver halide grains, such as the emulsions set forth in U. S. Patent 2,456,956, dated December 21, 1948, can also be employed in practicing our invention.

The emulsions prepared in accordance with our invention can be coated in the usual manner on any suitable support, e. g. glass, cellulose nitrate film, cellulose acetate film, polyvinylacetal resin film, paper or metal.

Photographic silver halide emulsions, such as those listed above, containing the supersensitizing combinations of our invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085, 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spense and Carroll U. S. application Ser. No. 771,380, filed August 29, 1947, now Patent No. 2,640,776 etc.; or mixtures of such addenda. Dispersing agents for color couplers, such as those set forth in U. S. Patents 2,322,027 and 2,304,940, can also be employed in the above-described emulsions.

In the above table it will be noted that in certain examples the amounts of dyes used in the supersensitizing combinations do not correspond to the amounts used with each dye alone. Actually, supersensitization occurs according to our invention when the combination of dyes gives more speed than either dye alone at any concentration. Thus, in some instances, the amount of dye, when used alone, is not identical with that used in the supersensitizing combination. This is due to the fact that optimum conditions have been used, insofar as possible, in each of the coatings. Use of larger amounts of dyes in the supersensitizing combinations is not necessary, and in some instances, is actually detrimental.

What we claim as our invention and desire secured by Letters Patent of the United States is:

1. A photographic silver halide emulsion sensitized with a supersensitizing combination of at least one cyanine dye selected from those represented by the following general formula:

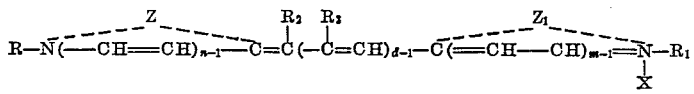

wherein R and $R_1$ each represents an alkyl group, $R_2$ and $R_3$ each represents a member selected from the group consisting of a hydrogen atom and an alkyl group, X represents an acid radical, $d$, $m$, and $n$ each represents a positive integer of from 1 to 2, and Z and $Z_1$ each represents the non-metallic atoms necessary to complete a heterocyclic nucleus containing from 5 to 6 atoms in the heterocyclic ring, provided that when the intercyclic chain contains an alkyl substituent only one of the groups selected from the group consisting of Z and $Z_1$ can represent the non-metallic atoms necessary to complete a heterocyclic nucleus of the quinoline series, and at least one un-ionized dye selected from those represented by the following general formula:

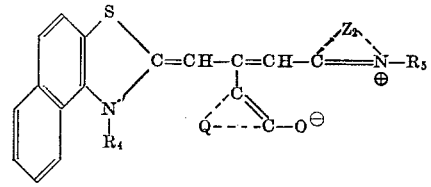

wherein $R_4$ and $R_5$ each represents an alkyl group, Q represents the non-metallic atoms necessary to complete a nucleus selected from the group consisting of those of the indanione series, those of the barbituric acid series, those of the 2-thiobarbituric acid series, and those of the isoxazolone series, and $Z_2$ represents the non-metallic atoms necessary to complete a heterocyclic nucleus selected from the group consisting of those of the benzothiazole series, those of the naphthothiazole series, those of the benzoselenazole series, those of the naphthoselenazole series, and those of the naphthoxazole series.

2. A photographic gelatino-silver-halide emulsion sensitized with a supersensitizing combination of at least one cyanine dye selected from those represented by the following general formula:

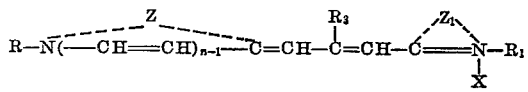

wherein R and $R_1$ each represents an alkyl group containing from 1 to 2 carbon atoms, $R_3$ represents a member selected from the group consisting of a hydrogen atom and an alkyl group containing from 1 to 2 carbon atoms, X represents an acid radical, $n$ represents a positive integer of from 1 to 2, Z represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, those of the naphthoxazole series, those of the 2-quinoline series, and those of the 4-quinoline series, and $Z_1$ represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, and those of the naphthoxazole series, and at least one un-ionized dye selected from those represented by the following general formula:

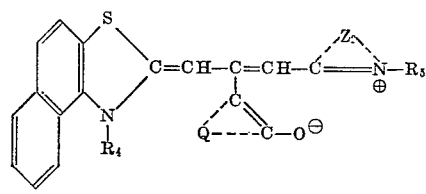

wherein $R_4$ and $R_5$ each represents an alkyl group containing from 1 to 2 carbon atoms, Q represents the non-metallic atoms necessary to complete a nucleus selected from the group consisting of those of the barbituric acid series, those of the 2-thiobarbituric acid series, those of the indandione series, and those of the isoxazolone series, and $Z_2$ represents the non-metallic atoms necessary to complete a heterocyclic nucleus selected from the group consisting of those of the naphthothiazole series, those of the naphthoselenazole series, and those of the naphthoxazole series.

3. A photographic gelatino-silver-bromiodide emulsion sensitized with a supersensitizing combination of at least one cyanine dye selected from those represented by the following general formula:

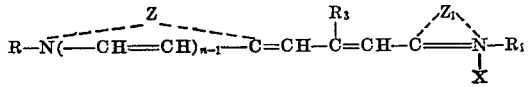

wherein R and R₁ each represents an alkyl group containing from 1 to 2 carbon atoms, R₃ represents a member selected from the group consisting of a hydrogen atom and an alkyl group containing from 1 to 2 carbon atoms, X represents an acid radical, n represents a positive integer of from 1 to 2, Z represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, those of the naphthoxazole series, those of the 2-quinoline series and those of the 4-quinoline series, and Z₁ represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, and those of the naphthoxazole series, and at least one un-ionized dye selected from those represented by the following general formula:

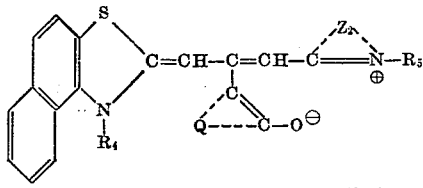

wherein R₄ and R₅ each represents an alkyl group containing from 1 to 2 carbon atoms, Q represents the non-metallic atoms necessary to complete a heterocyclic nucleus of the barbituric acid series, and Z₂ represents the non-metallic atoms necessary to complete a heterocyclic nucleus of the naphthothiazole series.

4. A photographic gelatino-silver-halide emulsion sensitized with a supersensitizing combination of at least one cyanine dye selected from those represented by the following general formula:

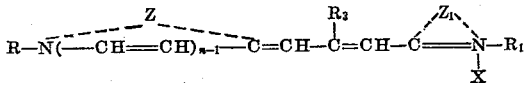

wherein R and R₁ each represents an alkyl group containing from 1 to 2 carbon atoms, R₃ represents a member selected from the group consisting of a hydrogen atom and an alkyl group containing from 1 to 2 carbon atoms, X represents an acid radical, n represents a positive integer of from 1 to 2, Z represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, those of the naphthoxazole series, those of the 2-quinoline series and those of the 4-quinoline series, and Z₁ represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, and those of the naphthoxazole series, and at least one un-ionized dye selected from those represented by the following general formula:

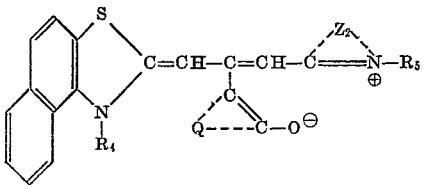

wherein R₄ and R₅ each represents an alkyl group containing from 1 to 2 carbon atoms, Q represents the non-metallic atoms necessary to complete a heterocyclic nucleus of the 2-thiobarbituric acid series, and Z₂ represents the non-metallic atoms necessary to complete a heterocyclic nucleus of the naphthothiazole series.

5. A photographic gelatino-silver-bromiodide emulsion sensitized with a supersensitizing combination of at least one cyanine dye selected from those represented by the following general formula:

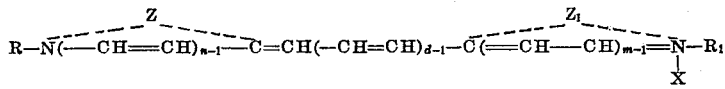

wherein R and R₁ each represents an alkyl group containing from 1 to 2 carbon atoms, d, m and n each represents a positive integer of from 1 to 2, X represents an acid radical, and Z and Z₁ each represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, those of the naphthoxazole series, those of the 2-quinoline series, and those of the 4-quinoline series, and at least one un-ionized dye selected from those represented by the following general formula:

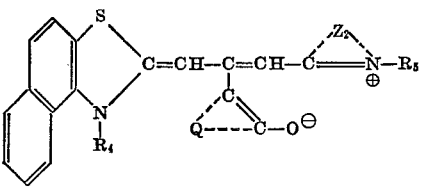

wherein R₄ and R₅ each represents an alkyl group containing from 1 to 2 carbon atoms, Q represents the non-metallic atoms necessary to complete a nucleus selected from the group consisting of those of the barbituric acid series, those of the 2-thiobarbituric acid series, those of the indandione series, and those of the isoxazolone series and Z₂ represents the non-metallic atoms necessary to complete a heterocyclic nucleus selected from the group consisting of those of the naphthothiazole series, those of the naphthoselenazole series, and those of the naphthoxazole series.

6. A photographic gelatino-silver-halide emulsion sensitized with a supersensitizing combination of at least one cyanine dye selected from those represented by the following general formula

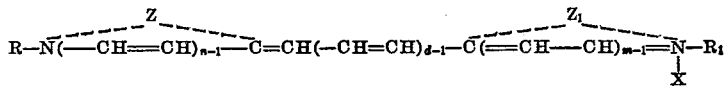

wherein R and R₁ each represents an alkyl group containing from 1 to 2 carbon atoms, d, m and n each represents a positive integer of from 1 to 2, X represents an acid radical, and Z and Z₁ each represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, those of the naphthoxazole series, those of the 2-quinoline series, and those of the 4-quinoline series, and at least one un-ionized dye selected from those represented by the following general formula:

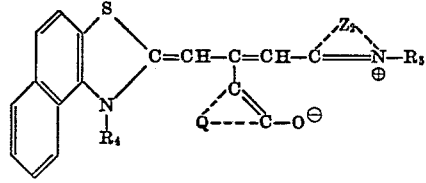

wherein $R_4$ and $R_5$ each represents an alkyl group containing from 1 to 2 carbon atoms, Q represents the non-metallic atoms necessary to complete a heterocyclic nucleus of the barbituric acid series, and $Z_2$ represents the non-metallic atoms necessary to complete a heterocyclic nucleus of the naphthothiazole series.

7. A photographic gelatino-silver-halide emulsion sensitized with a supersensitizing combination of at least one cyanine dye selected from those represented by the following general formula:

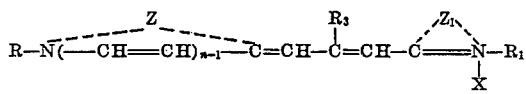

wherein R and $R_1$ each represents an alkyl group containing from 1 to 2 carbon atoms, $R_3$ represents a member selected from the group consisting of a hydrogen atom and an alkyl group containing from 1 to 2 carbon atoms, X represents an acid radical, n represents a positive integer of from 1 to 2, Z represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, those of the naphthoxazole series, those of the 2-quinoline series and those of the 4-quinoline series, and $Z_1$ represents the non-metallic atoms necessary to complete a heterocyclic nucleus selected from the group consisting of those of the thiazole series, those of the benzothiazole series, those of the naphthothiazole series, those of the benzoselenazole series, those of the naphthoselenazole series, those of the benzoxazole series, and those of the naphthoxazole series, and at least one un-ionized dye selected from those represented by the following general formula:

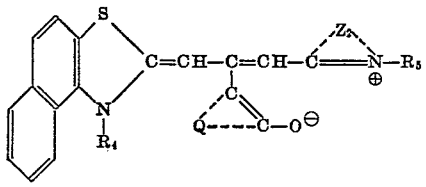

wherein $R_4$ and $R_5$ each represents an alkyl group containing from 1 to 2 carbon atoms, Q represents the non-metallic atoms necessary to complete a heterocyclic nucleus of the isoxazolone series, and $Z_2$ represents the non-metallic atoms necessary to complete a heterocyclic nucleus of the naphthothiazole series.

8. A photographic gelatino-silver-halide emulsion sensitized with a supersensitizing combination of at least one cyanine dye selected from those represented by the following general formula:

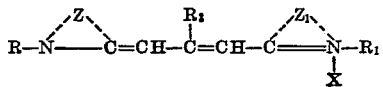

wherein R, $R_1$, and $R_3$ each represents an alkyl group of the formula $C_nH_{2n+1}$ wherein n represents a positive integer of from 1 to 2, X represents an acid radical, and Z and $Z_1$ each represents the non-metallic atoms necessary to complete a heterocyclic nucleus of the naphthothiazole series, and at least one un-ionized dye selected from those represented by the following general formula:

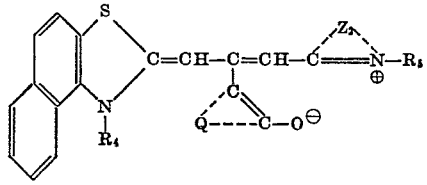

wherein $R_4$ and $R_5$ each represents an alkyl group containing from 1 to 2 carbon atoms, $Z_2$ represents the non-metallic atoms necessary to complete a heterocyclic nucleus of the naphthothiazole series, and Q represents the non-metallic atoms necessary to complete a heterocyclic nucleus of the barbituric acid series.

9. A photographic gelatino-silver-halide emulsion sensitized with a supersensitizing combination of 9-ethyl-3,3'-dimethyl-4,5,4',5'-dibenzothiacarbocyanine chloride and 1,3-diethyl-5-[di(1-ethyl-2(1H)-β-naphthothiazolylidene)isopropylidene]barbituric acid.

10. A photographic gelatino-silver-halide emulsion sensitized with a supersensitizing combination of at least one cyanine dye selected from those represented by the following general formula:

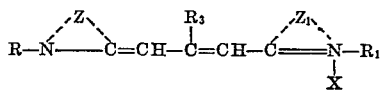

wherein R, $R_1$, and $R_3$ each represents an alkyl group of the formula $C_nH_{2n+1}$ wherein n represents a positive integer of from 1 to 2, X represents an acid radical, and Z and $Z_1$ each represents the non-metallic atoms necessary to complete a heterocyclic nucleus of the naphthothiazole series, and at least one un-ionized dye selected from those represented by the following general formula:

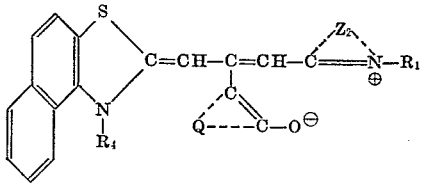

wherein $R_4$ and $R_5$ each represents an alkyl group containing from 1 to 2 carbon atoms, $Z_2$ represents the non-metallic atoms necessary to complete a heterocyclic nucleus of the naphthothiazole series, and Q represents the non-metallic atoms necessary to complete a heterocyclic nucleus of the 2-thiobarbituric acid series.

11. A photographic gelatino-silver-halide emulsion sensitized with a supersensitizing combination of 9-ethyl-3,3'-dimethyl-4, 5, 4',-5'-dibenzothiacarbocyanine chloride and 5-[(3-ethyl-2(3H)-α-naphthothiazolylidene)(1-ethyl-2(1H)-β-naphthiazolylidene)isopropylidene]-1-methyl-2-thiobarbituric acid.

12. A photographic gelatino-silver-halide emulsion sensitized with a supersensitizing combination of at least one cyanine dye selected from those represented by the following general formula:

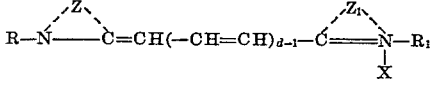

wherein R and $R_1$ each represents an alkyl group containing from 1 to 2 carbon atoms, X represents an acid radical, d represents a positive integer of from 1 to 2, Z represents the non-metallic atoms necessary to complete a heterocyclic nucleus of the benzoxazole series, and $Z_1$ represents the non-metallic atoms necessary to complete a heterocyclic nucleus of the benzothiazole series, and at least one un-ionized dye selected from those represented by the following general formula:

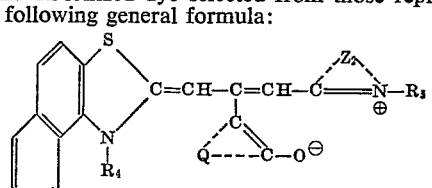

wherein R4 and R5 each represents an alkyl group containing from 1 to 2 carbon atoms, Z2 represents the non-metallic atoms necessary to complete a heterocyclic nucleus of the naphthothiazole series, and Q represents the non-metallic atoms necessary to complete a heterocyclic nucleus of the barbituric acid series.

13. A photographic gelatino-silver-halide emulsion sensitized with a supersensitizing combination of 3,3'-diethyloxathiacarbocyanine iodide and 5-[(1-ethyl-2(1H)-β-naphthothiazolylidene) (1-methyl-2(1H)-β-naphthothiazolylidene)isopropylidene] - 1,3 - di(β - methoxyethyl)barbituric acid.

14. A photographic gelatino-silver-halide emulsion sensitized with a supersensitizing combination of at least one cyanine dye selected from those represented by the following general formula:

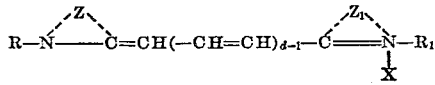

wherein R and R1 each represents an alkyl group containing from 1 to 2 carbon atoms, X represents an acid radical, d represents a positive integer of from 1 to 2, Z represents the non-metallic atoms necessary to complete a heterocyclic nucleus of the benzoselenazole series, and Z1 represents the non-metallic atoms necessary to complete a heterocyclic nucleus of the benzoselenazole series, and at least one un-ionized dye selected from those represented by the following general formula:

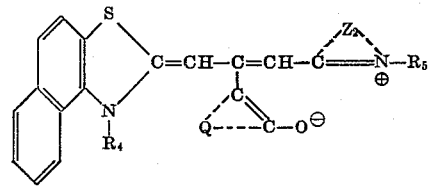

wherein R4 and R5 each represents an alkyl group containing from 1 to 2 carbon atoms, Z2 represents the non-metallic atoms necessary to complete a heterocyclic nucleus of the naphthothiazole series, and Q represents the non-metallic atoms necessary to complete a heterocyclic nucleus of the barbituric acid series.

15. A photographic gelatino-silver-halide emulsion sensitized with a supersensitizing combination of 3,3'-diethylselenacyanine iodide and 5-[(1-ethyl-2(1H)-β-naphthothiazolylidene) (1 - methyl - 2(1H) - β - naphthothiazolylidene)isopropylidene] - 1,3 - di(β - methoxyethyl)barbituric acid.

16. A photographic gelatino-silver-halide emulsion sensitized with a supersensitizing combination of at least one cyanine dye selected from those represented by the following general formula:

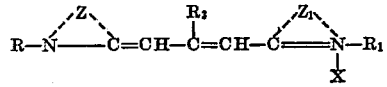

wherein R, R1, and R3 each represents an alkyl group of the formula $C_nH_{2n+1}$ wherein n represents a positive integer of from 1 to 2, X represents an acid radical, and Z and Z1 each represents the non-metallic atoms necessary to complete a heterocyclic nucleus of the benzothiazole series, and at least one un-ionized dye selected from those represented by the following general formula:

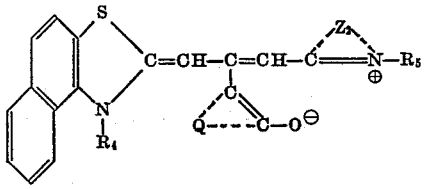

wherein R4 and R5 each represents an alkyl group containing from 1 to 2 carbon atoms, Z2 represents the non-metallic atoms necessary to complete a heterocyclic nucleus of the benzothiazole series, and Q represents the non-metallic atoms necessary to complete a heterocyclic nucleus of the 5(4H)-isoxazolone series.

17. A photographic gelatino-silver-halide emulsion sensitized with a supersensitizing combination of 9-ethyl-3,3'-dimethylthiacarbocyanine bromide and 4-[di(1-ethyl-2(1H) - β - naphthothiazolylidene)isopropylidene] - 3-phenyl-5(4H)-isoxazolone.

No references cited.